United States Patent Office 2,933,828
Patented Apr. 26, 1960

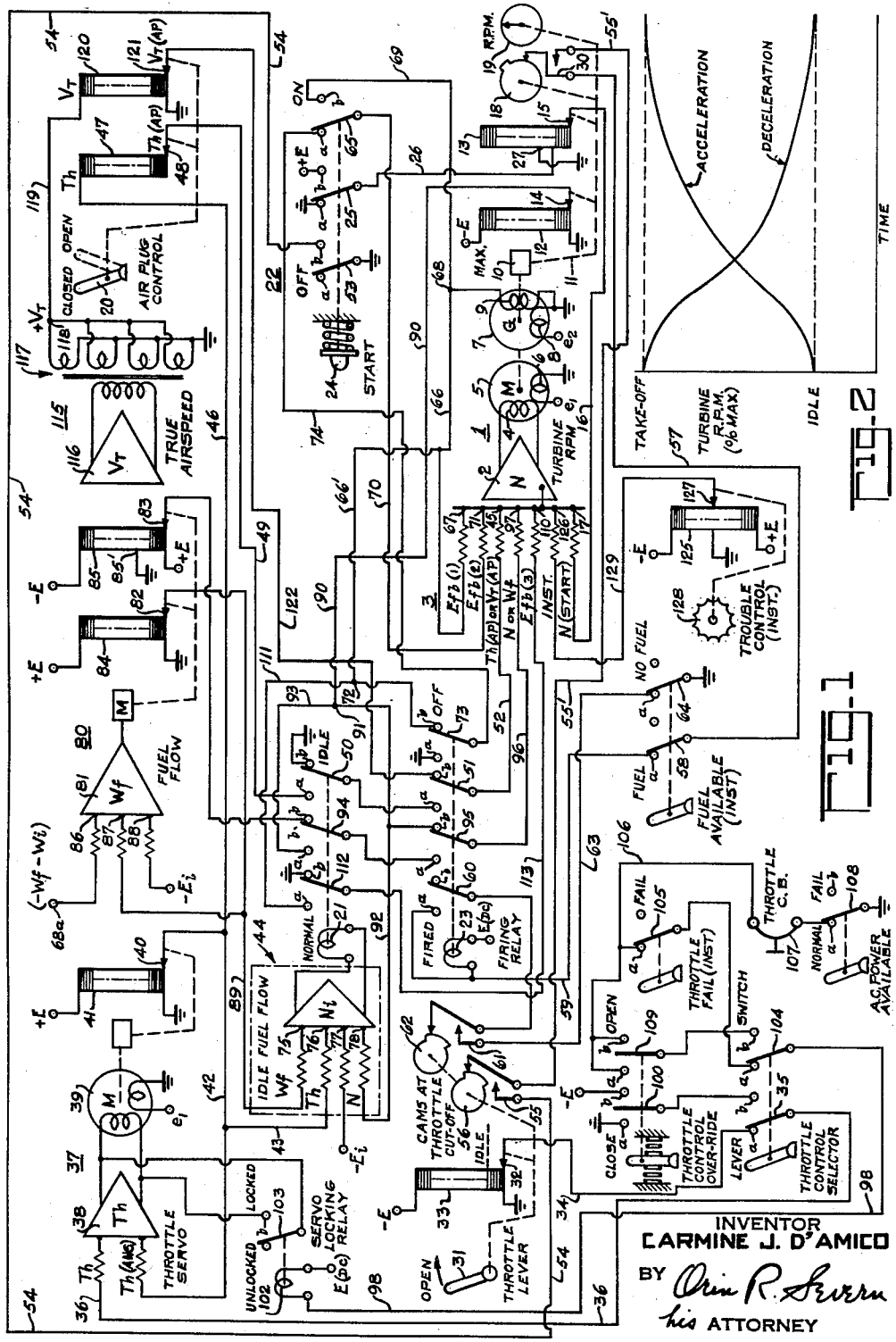

2,933,828

SYSTEM FOR SIMULATING AIRCRAFT TURBO-JET ENGINE OPERATION

Carmine J. D'Amico, Union City, N.J., assignor to Curtiss-Wright Corporation, a corporation of Delaware Application November 23, 1954, Serial No. 470,602

9 Claims. (Cl. 35—12)

This invention relates to means for simulating the operation of aircraft turbo-jet engines, and in particular to means for simulating the speed response of a turbo-jet aircraft engine.

In modern control systems for aircraft jet engines such as those used in U.S. military aircraft, the pilot's throttle lever may be indirectly connected to the fuel control system through an intermediate system that limits or schedules the supply of fuel to the jet engine at a safe rate, regardless of the rate of throttle advance. Thus, the throttle-controlled scheduling system determines maximum rates of acceleration and deceleration of the jet turbine according to the engine characteristics and temperature limits.

A principal object of the present invention therefore is to provide an improved and realistic simulating system suitable for the ground training of aircraft personnel, adapted to represent the r.p.m. response of an aircraft jet engine turbine to throttle control and other conditions.

The invention will be more fully set forth in the following description referring to the accompanying drawing, and the features of novelty will be pointed out with particularity in the claims annexed to and forming a part of this specification.

Referring to the drawing, Fig. 1 is a partly diagrammatic and schematic illustration of analog computing circuits for representing the starting system, throttle control and r.p.m. computation and indication of a simulated aircraft turbo-jet engine; and Fig. 2 diagrammatically illustrates typical turbine speed characteristic acceleration and deceleration curves of a turbo-jet engine of the type herein simulated.

Referring to Fig. 1, which illustrates the various control circuits and servo systems for computing turbine r.p.m., the primary servo system responsive to various factors for computing turbine r.p.m. (N) is generally indicated at 1 and comprises a conventional summing amplifier 2 having an input network generally indicated at 3 adapted to be energized by various alternating current signal voltages of varying magnitude and sense for computing N. An A.C. summing amplifier of this type is well-known in the art, the algebraic sum or resultant of the input signals being amplified to produce the output voltage. This amplified output voltage energizes the control coil 4 of an A.C. two-phase motor 5, the other coil 6 of which is energized by an A.C. reference voltage $e_1$. The motor 5 drives a two-phase feedback generator 7 also having a reference voltage winding 8 energized by the reference voltage $e_2$ and a feedback winding 9 for generating feedback voltage for the amplifier input network as hereinafter described. The operation of this type of motor is well-known, the motor speed and direction being according to the magnitude and phase relation respectively of the current in the control winding 4 with respect to the reference voltage $e_1$; also the phase relation and magnitude of the feedback voltage depend respectively on the direction and speed of rotation of the generator. The motor generator (M-G) is suitably connected through a gear reducer 10 and mechanical connection 11 to a pair of potentiometers 12 and 13 so as to adjust the respective slider contacts 14 and 15 according to the instantaneous position of the servo motor.

The potentiometers 12 and 13, as in the case of the other potentiometers indicated in the drawing, are actually of the circular wound-card type but are shown in a plane development for simplifying the disclosure. In practice, the slider 14 for example is operated by a shaft disposed centrally of the circular card so as to make continuous contact therewith throughout the range of the servo motor. Accordingly the voltage derived at the slider contact represents a function, depending on the potentiometer design, of the computed r.p.m. quantity. Where the potentiometer is energized by a variable voltage representing another factor, the derived slider voltage then represents the product of the combined functions.

The card 12 is energized at its upper terminal by a constant A.C. voltage $-E$ (phased as indicated with respect to the system reference voltage) and is grounded at its lower terminal so that the voltage derived at slider 14 represents turbine r.p.m. (N) for use in the computing system as hereinafter described. The various potentiometer energizing voltages throughout the system are A.C. voltages and are indicated as having instantaneous polarity with respect to the system reference voltage. The card 13, which is particularly designed for the starting operation, is adapted to be energized near its lower terminal by a constant A.C. voltage $+E$ from the "start" switch presently described and is grounded above the voltage supply tap at a point representing "idle r.p.m." ($N_i$). The voltage derived at slider 15 is fed by conductor lead 16 to the amplifier input network at terminal 17 for "starting" purposes. The servo motor also positions a switch cam 18 and an r.p.m. indicator 19.

An earlier system for computing turbo-jet r.p.m. under varying flight and engine conditions is disclosed and claimed in a copending application S.N. 291,254 filed June 2, 1952 by Stern et al., now Patent No. 2,798,308, and assigned to the same assignee as the present invention.

*Starting operation*

Assuming that the student pilot wishes to simulate starting of a turbo-jet engine of a jet aircraft, the following conditions must be met:

(a) The air plug (AP) lever 20 is in the "open" position, (b) The "idle r.p.m." ($N_i$) relay 21 is de-energized and in the "idle" position, (c) The "start" switch generally indicated at 22 is in the "off" position, and (d) The "firing" relay 23 is de-energized and in the "off" position.

For simulating ground starting the pilot presses the start button 24, thereby holding the start switch 22 at "on" position. This represents that the engine starter has been engaged and is cranking. Accordingly the switch 25 is moved from its grounded $a$ contact to its $b$ contact which is connected to a constant A.C. source $+E$. Accordingly, the N card 13 is now energized through lead 26 from this source for supplying the starting r.p.m. potential. The resulting derived voltage at slider 15 is fed by conductor lead 16 to the N amplifier input terminal 17 so as to energize the servo motor and thereby indicate initial starting r.p.m. Thus the servo motor tends to run in the direction of increased r.p.m. (i.e. to move the sliders upward on the cards) at a rate dependent jointly on the design of the card 13 and the servo feedback control presently described, until the slider 15 of card 13 reaches the grounded tap at 27. At this point the starting voltage is removed from the N input network and other voltage signals representing "idle r.p.m." operation have been applied to the network. As the N servo picks up starting r.p.m. the servo operated switch cam 18 closes the switch 30, as within a range of approximately 6 to 9 percent of full-power r.p.m. for example.

A prerequisite to "firing" the engine for "idle r.p.m." operation is positioning the throttle lever 31 at the "idle r.p.m." position so as to advance the slider 32 of the throttle lever card 33 from "off" (ground tap) to the "idle" position. This derived voltage is fed by lead 34 to the *a* contact of the "throttle control selector" switch 35 and lead 36 to the throttle servo system (T$h$) generally indicated at 37. This system comprises a servo amplifier 38, the output of which energizes a two-phase servo motor 39 of the type previously described for operating the slider 40 of the throttle servo card 41. The upper terminal of this card is energized by a constant A.C. voltage $+E$ and the lower terminal is grounded so that the derived voltage at slider 40 represents the programmed control of fuel supply to the engine. This voltage is used for several purposes including an "answer" voltage on conductor 42 for the throttle servo amplifier 38, an input voltage, leads 42 and 43, for the "idle fuel flow" thyratron for controlling idle r.p.m. ($N_i$) generally indicated at 44, and (for normal operation) an input voltage for terminal 45 of the N amplifier input network. This voltage is modified by other factors and the respective circuit from card 41 includes lead 46, air plug card 47 and its slider 48, lead 49, the *a* contact of $N_i$ switch 50 (closed in "normal" operation) the *a* contact of the "firing relay" switch 51 and lead 52 which is connected to the respective proportioning input resistance at terminal 45.

Referring again to the starting switch 22 which is being held "on" by the pilot, the start switch 53 at the "on" position completes a ground circuit at its *b* contact for the "firing" relay 23 by way of lead 54, cam switch 55 (which is closed by the switch cam 56 when the throttle lever 31 is advanced to idle r.p.m. position), lead 55', N cam switch 30 (which is closed at starting values of r.p.m.), lead 57, instructor's "fuel available" switch 58 on its *a* contact and lead 59 to one terminal of the firing relay 23, the other terminal of which is energized by a D.C. voltage as indicated. When the firing relay is operated to the "firing" position its switch 60 is closed on its *a* contact to provide for the firing relay a holding circuit including the "throttle lever" switch 61 that is closed by the switch cam 62 at, and above, idle r.p.m. position, lead 63 and the *a* contact of the instructor's "fuel available" switch 64. When the energizing circuit of the firing relay 23 is locked in by the aforesaid holding circuit, the pilot can release the start button 24.

While the start switch is still "on" and prior to energization of the firing relay, the start switch 65 engaging its *b* contact completes (in addition to the normal feedback circuit that includes lead 66 for the voltage $E_{fb(1)}$ from the feedback generator to the N input network terminal 67) a parallel feedback circuit from junction 68, lead 69, start switch 65 and lead 70 to the N input network terminal 71. Thus, the generator feedback potential represented by two voltages $E_{fb(1)}$ and $E_{fb(2)}$ is fed to the N input network through parallel circuits, thereby decreasing the effective circuit resistance and increasing the feedback effect during the starting period. Thus, a comparatively retarded or sluggish operation of the N servo during starting is provided for simulating the comparatively slow acceleration of the turbine rotor during cranking. This multiple feedback effect is retained during starting as long as the firing relay is in the "off" position. An alternate circuit for $E_{fb(2)}$ is completed by the start switch 65 when "off" engaging its *a* contact, thereby completing a parallel feedback circuit from feedback generator leads 66 and 66', junction 72, the *b* ("off") contact of firing relay switch 73, lead 74, the *a* contact of start switch 65 and lead 70 to the input network. This is effective during engine shutdown or "windmilling." When the start button is released and the firing relay is energized for "firing," the second feedback circuit is cutout for permitting the r.p.m. servo to pick up speed in simulation of actual firing of the engine.

*Idle fuel flow and idle r.p.m. operation*

In practice, with the throttle lever set at "idle r.p.m." position, the turbine upon firing rapidly comes up to its idle r.p.m. speed and maintains this speed until the throttle is advanced further. The idle r.p.m. is determined by an adjustment of fuel flow at a definite rate, such as 900 pounds per hour for example, referred to as idle fuel flow. For simulating idle r.p.m. ($N_i$) operation a thyratron including its input network is generally indicated at 44. When the thyratron fires according to well-known practice in response to a pre-determined increase in positive potential on its control grid, the thyratron relay 21 is energized to operate a plurality of switches as hereinafter described. The signal voltages energizing the thyratron input network represent respectively, fuel flow ($W_f$) at terminal 75, servo throttle (T$h$) position at terminal 76, a constant voltage $-E$ representing idle fuel flow at terminal 77, and the actual turbine r.p.m. (N) at terminal 78. For stable operation the oppositely phased voltages representing T$h$ and N at the terminals 76 and 78 are equal and so balance each other. Accordingly, when the positive fuel voltage $+W_f$ is less than the idle fuel flow voltage $-E_i$, the thyratron does not fire and hence the relay 21 is in the de-energized or "idle" position. However when $+W_f$ exceeds $-E_i$ the increased positive voltage causes the $N_i$ thyratron to fire, thereby energizing the relay 21 and moving the relay switches to the "normal" position. This is the usual operating condition of the turbine.

Referring specifically to the $N_i$ signal input circuits, the voltage $W_f$ comes from a fuel servo generally indicated at 80 which includes a servo amplifier 81 and a servo motor and associated mechanism M for operating the slider contacts 82 and 83 of the $W_f$ cards 84 and 85 respectively. The input network of the servo amplifier 81 is energized by a so-called fuel increment voltage $$-(W_f-W_i)$$

at terminal 86 representing the difference between total fuel flow and idle fuel flow. A system for producing this increment voltage is disclosed in the aforesaid copending application S.N. 291,254 referring specifically to Fig. 2 transformer terminal 68a. Another input is the derived $W_f$ answer voltage at input terminal 87 from slider 82 of card 84, this card being energized by a voltage $+E$ opposite in sense to the aforesaid increment voltage. Another signal is a constant voltage $-E_i$ at terminal 88 representing the "idle fuel flow" value previously referred to. It will therefore be seen that the algebraic summation of these inputs represents $W_f$, the engine fuel flow. The aforesaid answer voltage at slider 82 is also applied by lead 89 to the $N_i$ input terminal 75, constituting the $W_f$ signal above referred to.

Referring again to the $N_i$ system the input T$h$ signal is applied to the $N_i$ terminal 76 from the throttle servo slider 40 and leads 42 and 43, and the N signal is applied at terminal 78 from the slider 14 of the N card 12 by way of lead 90, junction 91 and lead 92. As above pointed out, the $N_i$ thyratron 44 remains unfired in "idle" position as long as the throttle lever 31 remains at the idle r.p.m. position, by reason of the fact that for this condition $W_f=W_i$ and the T$h$ and N signals are in stable balance. This balance is of course upset immediately upon advance of the throttle.

Throttle control

Assuming now that the pilot advances the throttle to increase turbine r.p.m. for normal operation, the apparatus will be put in the following condition:

(a) The air plug control 20 is in the "open" position,
(b) The $N_1$ thyratron relay is now energized in the "normal" position,
(c) The start button is at "off," and
(d) The firing relay is energized at "firing" position.

Under these conditions a voltage from the slider 40 of the $Th$ servo card 41 is fed as previously described to the air plug card 47, $N_1$ switch 50, firing relay switch 51 to the N input terminal 45 for representing a positive throttle control $Th$ signal. This voltage will be diminished by the AP card 47 if the "air plug" is not in the fully open position. An answer voltage of opposite sense from the N answer card 12 is now fed from lead 90, junction 91, lead 93, the $a$ contact of $N_1$ switch 94, the $a$ contact of firing relay switch 95 and lead 96 to the N input terminal 97. As the throttle lever is advanced to increase the derived voltage at the throttle slider 32, the throttle servo 37 tends to follow the throttle position. However, as the pilot may advance the throttle lever too rapidly for direct fuel supply to the turbine, the throttle servo follows the throttle movement at a predetermined maximum speed for scheduling the fuel supply so as to prevent overheating from too much fuel in the turbine combustion chamber. As previously indicated, the throttle lever voltage is fed through the "throttle control selector" switch 35 to the throttle servo amplifier 38 where it is balanced by the oppositely phased answer voltage from card 41. The response characteristics of this servo and the gear reduction ratio are such that the servo increases the derived voltage at slider 40 at a predetermined maximum rate, not withstanding sudden movement of the throttle to the full advanced position.

In the actual aircraft here simulated, the throttle lever normally controls the throttle servo through electric control circuits. If such circuits should become disabled, it is desirable that the pilot have available a so-called "throttle control override" switch for direct control of the throttle servo. This override switch is normally centered and is operable by the pilot to run the throttle servo in one direction or the other depending on whether the override switch is held at its "advance" or "retarded" position. When this switch is released it automatically centers itself to deenergize the throttle servo. When the pilot wishes to switch the control over to the "override switch," he first throws a "throttle control selector" switch to a "switch" position. This enables the override switch directly to control the throttle servo.

For simulating purposes, the "throttle control selector" switch 35 normally engages its $a$ contact for completing the throttle lever control circuit from the "throttle lever" card 33 to the $Th$ servo for usual operation. Where the instructor "fails" the throttle lever control by throwing the "throttle fail" switch 105 to the "fail" position so that the override switch control is now required, the selector switch 35 is moved to its $b$ contact at the "switch" position to cut in the override switch 100. This switch may now be moved in one direction or the other depending on whether the throttle control is to be advanced or retarded. If the switch 100 is moved to engage its $a$ contact, i.e. to close (retard) the throttle, the input signal on the $Th$ servo lead 36 is grounded so that the positive answer voltage from card 41 tends to run the $Th$ servo toward the "closed" position. If the pilot wishes to advance the throttle control, the override switch 100 is moved to engage its $b$ contact, thereby connecting the $Th$ input lead 36 to a voltage source —E. This voltage tends to run the $Th$ servo toward the open position as long as the pilot holds the override switch on "open" or until the opposed voltages are balanced at the fully-open throttle position.

During the aforesaid override switch operation, it is desirable that the $Th$ servo be locked against drifting when the override switch is not operating. Accordingly, a servo locking relay 102 is provided with a switch 103 for short-circuiting the control winding of the $Th$ servo motor 39 when the override switch is in neutral position. In the energized position of the locking relay the short-circuit is removed and in the de-energized position the switch 103 engages its $b$ contact to short the motor winding, thereby electrically locking it in position. The control of the locking relay is through the throttle control selector switch 104, this switch when on "throttle lever" control engaging its $a$ contact to complete an energizing circuit to ground for the relay coil. This circuit includes the D.C. source $E_{(DC)}$ connected to the relay coil 102, lead 98, selector switch 104 on its $a$ contact, the instructor's "throttle fail" switch 105 (normally on its $a$ contact), lead 106, "throttle circuit breaker" 107 and the instructor's "A.C. power available" switch 108 normally on its $a$ contact. It will be noted that when the instructor "fails" either the "throttle lever" control or the "A.C. power" by throwing the switches 105 or 108 to "fail," the above ground circuit is broken and the relay 102 is de-energized to lock the throttle servo. This can also be simulated by "tripping" the "throttle circuit breaker" 107. Accordingly, in normal operation on throttle lever control the locking relay 102 is maintained energized, i.e. in the "unlocked" position.

When the selector switch 104 is moved to its $b$ contact for "switch" control, the locking relay is now connected in circuit with the override switch 109 which is movable between its $a$ and $b$ contacts which are jointly connected as indicated to the normally grounded lead 106 previously described. Hence, when the override switch 109 is moved to engage either its $a$ or $b$ contact to close or open the throttle the locking relay 102 is temporarily energized to unlock the $Th$ servo, thereby permitting so-called "jogging" control of the $Th$ servo by the pilot through the override switch. Failure of the "switch" control can also be simulated by opening the "A.C. power" switch 108 or "tripping" the "circuit breaker" 107, thereby de-energizing the locking relay and locking the $Th$ servo in fixed position.

Referring to Fig. 2 which graphically illustrates typical turbine r.p.m. response to full throttle advance for maximum acceleration, and for full throttle retardation to idle r.p.m. for characteristic deceleration, the N servo system is provided with multiple feedback circuits adapted to function in combination with the throttle servo for simulating the turbine r.p.m. characteristics. The usual feedback signal $E_{fb(1)}$ at terminal 67 has previously been described in connection with the parallel feedback signal $E_{fb(2)}$ at terminal 71 for simulating starting characteristics. The feedback signal $E_{fb(2)}$ is not used after starting and while the engine is fired. For simulating normal acceleration and deceleration of the turbine a third feedback circuit in parallel with the first feedback circuit is connected to the N input terminal 110. This parallel circuit from feedback leads 66, 66' and junction 72 includes lead 111, the $a$ contact of the $N_1$ switch 112 (now on "normal") and lead 113 which is connected through the usual input proportioning resistance to the N terminal 110. The proportioning resistances of the parallel feedback circuits $E_{fb(1)}$ and $E_{fb(3)}$ are selected so as to produce the desired speed response characteristics of the N servo during normal operation ranging from idle r.p.m. to full power or "take-off" r.p.m. according to the characteristic curves of Fig. 2.

General operation

Assuming now that the pilot has "started" the turbojet engine as previously described and that the engine is now "fired" and running at idle r.p.m., the N servo is energized so as to run the servo to the position representing idle r.p.m. The input signals for this operation comprise the normal feedback signal $E_{fb(1)}$, a ground signal from $N_i$ switch 50 at terminal 45, and a $W_f$ signal from the $W_f$ card 85 at terminal 97. The second and third feedback circuits are grounded. The $W_f$ fuel signal is phased to run the N servo with minimum feedback effect toward increased r.p.m. until the $W_f$ servo reaches the idle fuel flow value indicated at the ground tap 85' on card 85. The $W_f$ servo continues to be adjusted toward "idle fuel flow" and the N servo follows with diminishing speed until there is a ground signal at $W_f$ slider 83. At this point the N servo is de-energized at the idle r.p.m. position as there are no energizing input signals for the N amplifier network. Since the operation of the N servo during idle r.p.m. depends on the fuel flow $W_f$ signal, it will be apparent that retarding of the throttle to a point indicative of less than the idle r.p.m. value is ineffective further to decrease r.p.m. below the idle value.

When the jet engine is operated in "idle" the fuel flow is kept constant at approximately 900 lbs. per hour. This is accomplished by making the changes in jet engine r.p.m. compensate for simulated changes in fuel flow due to variations in simulated altitude and ram pressure as disclosed in the aforesaid application S.N. 291,254. The ground tap 85' on $W_f$ card 85 represents a position of the $W_f$ servo for this value. If, under idle conditions the fuel flow is varied due to a change in simulated altitude or ram pressure, the derived voltage from $W_f$ card 85 applied to terminal 97 of the N servo causes this servo to run in a direction that will in turn cause the $W_f$ servo to return to its idle fuel flow position. Under idle conditions the throttle has no control over the fuel flow or engine r.p.m.

Assuming now that the throttle is advanced beyond idle, the $N_i$ thyratron will fire and energize the relay 21 to the "normal" position. This is due to the increased $+Th$ signal. The engine is now in its normal operating condition wherein it is fired and running above idle r.p.m. For this condition the input signals for the N servo now comprise a throttle signal $Th(AP)$ (as modified by air plug opening) from the AP card 47 at input terminal 45, and an oppositely phased answer voltage from the N card 12 at input terminal 97. Accordingly for normal operation the N servo seeks to match the position of the throttle servo, the control now having been transferred from fuel flow to throttle position. An additional feedback signal $E_{fb(3)}$ is now applied to the input terminal 110 for additional retarding of N acceleration as previously described.

When the throttle lever in a jet airplane is advanced suddenly, the r.p.m. of the jet engine responds in a characteristic manner due to the inertia of the engine rotor and the programming of the engine control. This response to a throttle burst is here simulated as previously described by interposing a throttle servo between the throttle lever and the N servo system. When the throttle lever is advanced suddenly, as for example from idle to take-off position, the throttle servo tends to follow-up but is limited by the maximum speed of the servo motor and the gear ratio between the motor and the potentiometer cards. This changes the virtually "step" input from the pilot's throttle lever card to a steadily increasing voltage from the throttle servo card 41 until the new $Th$ value is reached for stabilizing the N servo. The gear ratio of the throttle servo and the velocity feedback system of the N servo above described are adjusted to achieve the desired r.p.m response to throttle burst as diagrammatically illustrated by the acceleration curve of Fig. 2.

It will now be assumed that the airplane while in flight runs out of fuel for example, so that the engine is not fired. This is simulated by the instructor throwing the "fuel" switches 64 and 58 to the "no fuel" position thereby de-energizing the holding circuit of the firing relay 23. Cutting off the fuel results in a zero $W_f$ signal so that the $N_i$ thyratron cuts out and the relay 21 returns to "idle." As the fuel switch 58 is also open the firing relay now cannot be energized by the pilot's start button 24. This represents a condition wherein the rotor is "windmilling" under influence of the true airspeed ($V_T$) of the airplane. The N servo input signals now include the feedback voltages from parallel connected feedback circuits $E_{fb(1)}$ and $E_{fb(2)}$ at terminals 67 and 71 for material feedback effect respectively, an airspeed voltage $V_T(AP)$ at terminal 45 and an answer r.p.m. voltage N at terminal 97 from the N servo card 12. The aforesaid airspeed voltage is suitably obtained from a $V_T$ computing system generally indicated at 115 disclosed by way of example in a copending application S.N. 291,253, filed June 2, 1952, by Stern et al. now Patent No. 2,784,501, and assigned to the same assignee as the present invention. The $V_T$ system includes an amplifier 116 the output of which energizes a transformer 117 for producing at terminals 118 a voltage $+V_T$. This voltage energizes through lead 119 the air plug (AP) card 120 so that the voltage derived at slider 121 represents the airspeed voltage modified according to simulated opening of the air plug. This voltage is fed by lead 122 to the $b$ contact of firing relay switch 51 and hence by lead 52 to the proportioning resistance of the N servo input at terminal 45. Accordingly, the firing relay is effective to transfer control of the N servo from the throttle servo to airspeed control when the firing relay represents an "unfired" condition of the turbine, thereby to simulate windmilling of the turbine rotor. This windmilling signal can be removed simply by "closing" the air plug lever 20 so that a $V_T(AP)$ ground signal is obtained from the AP card 120, thereby enabling the remaining N answer voltage at input terminal 97 to run the N servo down to zero r.p.m.

The operation of the N servo system during simulated acceleration and deceleration of the turbine depends primarily on the $N_i$ system above described. When the turbine is running on idle r.p.m. and fired, the $N_i$ thyratron relay 21 is deenergized at "idle" position. That is, the $N_i$ inputs are balanced to the extent that $W_f = E_i$ and $Th = N$ so that the resultant voltage is not sufficiently positive to fire the thyratron. In this condition the N servo is on $W_f$ control without reference to the precise throttle position below idle r.p.m. Thus, the N servo remains at the idle r.p.m. position as long as the throttle is not advanced beyond "idle" and the $W_f$ signal from the $W_f$ card 85 does not exceed that representing idle fuel flow, i.e. a ground signal at tap 85'.

Assuming now that the pilot rapidly advances the throttle to accelerate the turbine, the $N_i$ thyratron is fired by reason of the predominating $Th$ positive voltage over the more slowly responding N negative voltage. The thryratron relay is now on "normal" so that the N servo control is transferred from fuel control to turbine r.p.m. control by the $N_i$ switch 94. In accordance with the advanced throttle position and the resulting increased r.p.m., the $W_f$ computed value also increases as disclosed in the aforesaid application S.N. 291,254 so that $+W_f$ now exceeds $-E_i$. Under these conditions, the $N_i$ thyratron remains fired. If the throttle has been advanced to the fully open position the N servo follows-up with a speed response characteristic indicated by the acceleration curve of Fig. 2.

It will now be assumed that the pilot rapidly retards the throttle to some intermediate position in advance of the idle position. In such a case the positive $Th$ signal is less than the slower responding negative N signal. However, the computed $W_f$ positive signal is sufficiently greater than the idle fuel flow negative signal $-E_i$ that the thyratron remains fired. As the positive $+W_f$ signal decreases for the adjustment to reduced r.p.m., the negative $-N$ signal also decreases so that a stable condition is reached wherein the $Th$ and N signals balance each other. During this transient condition the thyratron remains fired. However, when the throttle is retarded to or below the idle position the resulting decrease in the $+W_f$ signal now results in a negative signal predominating at the $N_1$ input so that the thyratron "cuts out" and the relay 21 returns to "idle" position where r.p.m. control is transferred back to fuel flow. Where the throttle is rapidly retarded from fully open to the idle position, the deceleration of the N servo follows the characteristic deceleration curve of Fig. 2.

For simulating "trouble" conditions an instructor's potentiometer 125 is provided for introducing a trouble signal to the N input terminal 126. The card is energized at its terminals by oppositely phased voltages and has a grounded center tap so that the adjustment of slider 127 by the instructor's control dial 128 is effective to apply signals representing either increased or decreased r.p.m. to the N servo by lead 129, thereby to represent faulty operation of the turbine, such as bearing seize, damage by over-heating or over-speeding, etc.

It should be understood that this invention is not limited to specific details of construction and arrangement thereof herein illustrated, and that changes and modifications may occur to one skilled in the art without departing from the spirit of the invention.

What is claimed is:

1. Apparatus for simulating the speed response of a turbo-jet aircraft engine, comprising a simulated throttle, a first electrical servo system responsive to simulated throttle operation by the pilot for producing an electrical control quantity variable in magnitude, said throttle responsive servo lagging said throttle movement and having a predetermined maximum rate of speed so that said control quantity represents scheduled fuel supply to the engine independently of instantaneous throttle position, a second electrical servo system normally responsive to said electrical quantity and operable to represent turbine r.p.m., said second system including a plurality of feedback proportioning resistances arranged to be selectively connected in the input of said second system according to different simulated engine operating conditions affecting the speed of the engine for receiving feedback signals, whereby the speed response of said second system is varied in response jointly to said electrical quantity and feedback signals for simulating the dynamic response characteristics of said engine.

2. Apparatus for simulating the speed response of a turbo-jet aircraft engine, comprising a simulated throttle, a first electrical servo system responsive to simulated throttle operation by the pilot for producing an electrical control quantity variable in magnitude at a predetermined maximum rate to represent scheduled fuel supply to the engine, a second electrical servo system normally responsive to said electrical quantity and operable to represent turbine r.p.m., said second system including feedback control means responsive to simulated engine operating conditions for varying the feedback characteristics, a third electrical system operable to produce an electrical quantity representing computed engine fuel flow, means responsive jointly to all three electrical systems for representing "idle" fuel flow of the engine, and means including transfer circuit means adapted selectively to transfer control of the r.p.m. system from the throttle quantity to said fuel quantity in response to a simulated "idle" fuel flow condition, said transfer means also being operable to control said feedback means, whereby the speed response of said second system simulates the response characteristics of said engine.

3. Apparatus as specified in claim 2 wherein said transfer means is jointly responsive to electrical quantities representing respectively computed fuel flow, "idle fuel flow," throttle position and turbine r.p.m. for selecting the transfer circuits according to simulated "normal" or "idle" engine condition.

4. Apparatus as specified in claim 2 including means for producing an electrical quantity representing air speed of the aircraft, and relay means alternatively controlled according to simulated "fired" and "un-fired" conditions of the turbine for applying respectively the represented fuel quantity or air speed quantity to control the r.p.m. system for a "fired" or "unfired" condition, said relay means also being operable to control said feedback means whereby the response of said r.p.m. system simulates "windmilling" of the turbine when the engine is "un-fired."

5. Apparatus for simulating the speed response of a turbo-jet aircraft engine comprising an electrical servo system operable to represent a function of turbine r.p.m., a plurality of feedback circuits having different characteristics adapted to be connected to said servo system for varying the characteristic speed response thereof, "start" control means operable by the pilot, means controlled by said "start" means for connecting at least one of said feedback circuits to the servo system for simulating the characteristic "start" response of the engine, and means controlled jointly by said "start" means and r.p.m. system for supplying potential to said r.p.m. system for operating said r.p.m. system to a position representing "idle" r.p.m., and for removing said potential at said position.

6. Apparatus for simulating the speed response of a turbo-jet aircraft engine, comprising a simulated throttle, a first electrical servo system responsive to simulated throttle operation by the pilot for producing an electrical control quantity variable in magnitude at a predetermined maximum rate to represent scheduled fuel supply to the engine, a second electrical servo system normally responsive to said electrical quantity and operable to represent turbine r.p.m., said second system including feedback control means responsive to different simulated engine operating conditions for varying the feedback characteristics, and means representing variable "air plug" opening for modifying the throttle electrical quantity that controls said second system, whereby the speed response of said second system simulates the response characteristics of said engine.

7. Apparatus for simulating the speed response of a turbo-jet aircraft engine, comprising a simulated throttle, a first electrical servo system normally responsive to simulated throttle operation by the pilot for producing an electrical control quantity variable in magnitude at a predetermined maximum rate to represent scheduled fuel supply to the engine, a second electrical servo system normally responsive to said electrical quantity and operable to represent turbine r.p.m., said second system including a feedback control means responsive to different simulated operating conditions for varying the feedback characteristics, control means for said first electrical system comprising a simulated throttle over-ride control and a simulated throttle control selector for transferring control of said first system from the throttle to the throttle over-ride, and vice versa, whereby the speed response of said second system simulates the response characteristics of said engine.

8. Apparatus as specified in claim 7 including means for locking said system in position to prevent drifting of throttle position and means controlled jointly by the throttle selector and throttle override for controlling the condition of said locking means.

9. Apparatus for simulating the speed response of a turbo-jet aircraft engine, comprising a simulated throttle, a first electrical servo system responsive to simulated throttle operation by the pilot for producing an electrical control quantity variable in magnitude at a predetermined maximum rate to represent scheduled fuel supply to the engine, a second electrical servo system normally responsive to said electrical quantity and operable to represent turbine r.p.m., said second system including feedback control means responsive to different simulated engine operating conditions for varying the feedback characteristics, said feedback means including a plurality of feedback circuits adapted to be connected in parallel to said second system, one of said circuits being connected to said second system for all conditions of operation, "start" means for initially energizing said second system and for connecting another circuit of said second system for added feedback effect during the engine "starting," and transfer means for controlling the energization of said second system after "starting" according to simulated "normal" or "idle" operation, said transfer means also adapted to connect another feedback circuit to said system for simulating speed response during normal operation, whereby the speed response of said second system simulates the response characteristics of said engine.

References Cited in the file of this patent

UNITED STATES PATENTS

| | | |
|---|---|---|
| 2,496,617 | Burelbach | Feb. 7, 1950 |
| 2,506,949 | Burelbach et al. | May 9, 1950 |
| 2,564,429 | Germanton | Aug. 14, 1951 |
| 2,608,005 | Kennedy | Aug. 26, 1952 |
| 2,771,243 | Wolin et al. | Nov. 20, 1956 |
| 2,798,308 | Stern et al. | July 9, 1957 |
| 2,808,658 | Stern et al. | Oct. 8, 1957 |